United States Patent
Tao et al.

(10) Patent No.: US 9,526,133 B2
(45) Date of Patent: Dec. 20, 2016

(54) LED RETROFIT LAMP WITH SHUNT CAPACITORS ACROSS RECTIFIER DIODES FOR USE WITH A BALLAST

(71) Applicant: KONINKLIJKE PHILIPS N.V., Eindhoven (NL)

(72) Inventors: Haimin Tao, Eindhoven (NL); William Peter Mechtildis Marie Jans, Born (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 44 days.

(21) Appl. No.: 14/377,197

(22) PCT Filed: Feb. 22, 2013

(86) PCT No.: PCT/IB2013/051444
§ 371 (c)(1),
(2) Date: Aug. 7, 2014

(87) PCT Pub. No.: WO2013/124827
PCT Pub. Date: Aug. 29, 2013

(65) Prior Publication Data
US 2015/0351171 A1  Dec. 3, 2015

Related U.S. Application Data

(60) Provisional application No. 61/602,710, filed on Feb. 24, 2012.

(51) Int. Cl.
*H05B 37/00* (2006.01)
*H05B 33/08* (2006.01)
(Continued)

(52) U.S. Cl.
CPC ............. *H05B 33/0809* (2013.01); *F21K 9/17* (2013.01); *F21K 9/175* (2013.01); *F21V 23/005* (2013.01); *H05B 33/08* (2013.01); *H05B 37/02* (2013.01)

(58) Field of Classification Search
CPC ................................ H05B 33/08; H05B 37/02
(Continued)

(56) References Cited

U.S. PATENT DOCUMENTS

| 7,265,496 B2* | 9/2007 | Allen | F21S 48/10 |
| | | | 315/185 R |
| 7,482,761 B2* | 1/2009 | Yang | F21V 23/00 |
| | | | 315/185 R |

(Continued)

FOREIGN PATENT DOCUMENTS

| CN | 201866593 U | 6/2011 |
| EP | 2178345 A2 | 4/2010 |

(Continued)

*Primary Examiner* — Tung X Le

(57) ABSTRACT

The invention relates to LED replacement lamp suitable for operation with a high frequency fluorescent lamp ballast, comprising—a LED load (LS) comprising a series arrangement of LEDs, —a first lamp end circuit comprising—a first lamp pin (LP1) and a second lamp pin (LP2) for connection to a first lamp connection terminal comprised in the high frequency fluorescent lamp ballast, —a first rectifier (D1-D4; D1, D2) equipped with at least one input terminal coupled to the second lamp pin and with first and second output terminals coupled to respective ends of the LED load, the first rectifier comprising at least two diodes, one of which is shunted by a first capacitor (C1), —a second lamp end circuit comprising—a third lamp pin (LP3) and a fourth lamp pin (LP4) for connection to a second lamp connection terminal comprised in the high frequency fluorescent lamp ballast, —a second rectifier (D5-D8, D5, D6) equipped with at least one input terminal coupled to the fourth lamp pin and with first and second output terminals coupled to respective ends of the LED load, the second rectifier comprising at least two diodes, one of which is shunted by a second capacitor (C2), wherein the first capacitor and the second capacitor form a series arrangement coupled between the second lamp pin and the fourth lamp pin.

13 Claims, 2 Drawing Sheets

(51) Int. Cl.
*F21K 99/00* (2016.01)
*H05B 37/02* (2006.01)
*F21V 23/00* (2015.01)

(58) Field of Classification Search
USPC .............. 315/185 R, 200 R, 291, 294, 312
See application file for complete search history.

(56) References Cited

U.S. PATENT DOCUMENTS

| | | | | |
|---|---|---|---|---|
| 7,609,006 | B2 * | 10/2009 | Gibboney | H05B 33/0803 |
| | | | | 315/185 S |
| 8,115,411 | B2 * | 2/2012 | Shan | G09F 9/33 |
| | | | | 315/185 S |
| 8,358,056 | B2 * | 1/2013 | Park | H05B 33/0803 |
| | | | | 313/498 |
| 2010/0096976 | A1 | 4/2010 | Park | |
| 2011/0043127 | A1 * | 2/2011 | Yamasaki | H05B 33/0809 |
| | | | | 315/291 |
| 2011/0043136 | A1 | 2/2011 | Radermacher | |
| 2011/0121756 | A1 | 5/2011 | Thomas | |
| 2011/0204813 | A1 | 8/2011 | Chang | |

FOREIGN PATENT DOCUMENTS

| | | | |
|---|---|---|---|
| WO | 2009035203 | A1 | 3/2009 |
| WO | 2010069983 | A1 | 6/2010 |
| WO | 2013057669 | A1 | 4/2013 |

\* cited by examiner

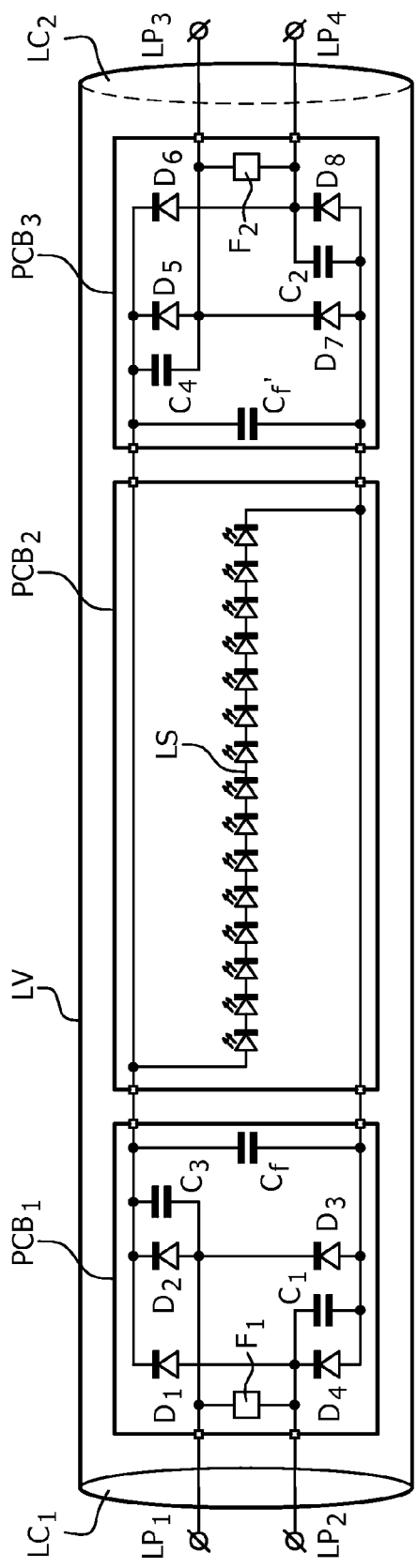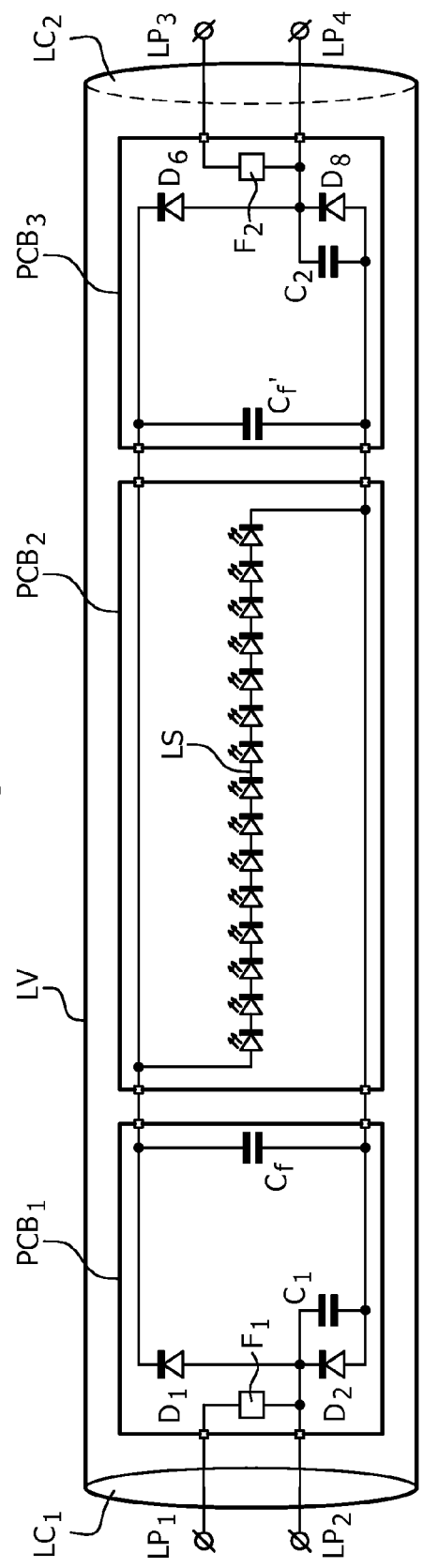

LED RETROFIT LAMP WITH SHUNT CAPACITORS ACROSS RECTIFIER DIODES FOR USE WITH A BALLAST

CROSS-REFERENCE TO PRIOR APPLICATIONS

This application is the U.S. National Phase application under 35 U.S.C. §371 of International Application No. PCT/IB2013/051444, filed on Feb. 22, 2013, which claims the benefit of U.S. Patent Application No. 61/602,710, filed on Feb. 24, 2012. These applications are hereby incorporated by reference herein.

FIELD OF THE INVENTION

The invention relates to a LED replacement lamp that is suitable for operation with a fluorescent lamp ballast, more in particular with a high frequency fluorescent lamp ballast. The LED replacement lamp is equipped with lamp pins, like a fluorescent lamp so that it can be directly coupled to the fluorescent lamp ballast.

BACKGROUND OF THE INVENTION

Fluorescent lamps have been a very successful light source. They are used on a huge scale. In fact more than 60% of the artificial light is generated by fluorescent lamps today. However, in recent years LED lighting technology has been rapidly developed and replacement of fluorescent lamps by LED replacement lamps becomes attractive because of the high efficiency of LED lamps and their long life.

There are various LED replacement lamps on the market today. An example of such a LED replacement lamp is disclosed in US 2011121756.

For proper operation, most of these replacement lamps require a rewiring of the fluorescent lamp fixture, by taking out the ballast or bypassing it. However, the easiest way to upgrade a fluorescent lamp luminaire is by taking out the fluorescent lamp and replacing it with a LED replacement lamp. In that case no rewiring or opening of the fixture is required.

LEDs are more efficient than fluorescent lamps (higher lumen/Watt). Furthermore, the LEDs comprised in a LED replacement tube shine most of their light downwards so that a LED replacement lamp has a much higher optical efficiency than a fluorescent lamp shining its light all around the tube. As a consequence, in case for instance a four feet fluorescent lamp with a nominal power of 32 Watt is replaced by a LED replacement lamp generating the same amount of light on a desk situated under it, the power consumption of the LED replacement lamp is approximately 20-25 Watt, based on the present efficiency of the LEDs. The power consumption of the LED replacement lamp will further decrease when the efficiency of the LEDs increases in the future. Handling this difference in the power consumed by the LED replacement lamp and the power consumed by the fluorescent lamp that the fluorescent lamp diver was designed for, is a key challenge in LED replacement lamp design.

In the LED replacement lamp disclosed in US 2011121756 the LED replacement lamp is equipped with rectifiers and LC filters to generate a DC-current out of the high frequency voltage supplied by the fluorescent lamp ballast. However, US 2011121756 does not disclose any features to ensure that the power consumed by the LED replacement lamp is lower than the power supplied by the high frequency fluorescent lamp ballast.

SUMMARY OF THE INVENTION

The invention aims to provide a LED replacement lamp, comprising a comparatively low number of components, that can be directly connected to the lamp connection terminals of a fluorescent lamp ballast, preferably a high frequency fluorescent lamp ballast, to replace a fluorescent lamp and consumes less power than the fluorescent lamp that the high frequency fluorescent lamp ballast was designed for.

According to a first aspect of the invention, a LED replacement lamp is provided, suitable for operation with a high frequency fluorescent lamp ballast, comprising
  a LED load comprising a series arrangement of LEDs,
  a first lamp end circuit comprising
  a first lamp pin and a second lamp pin for connection to
    a first lamp connection terminal comprised in the high frequency fluorescent lamp ballast,
    a first rectifier equipped with at least one input terminal coupled to the first lamp pin and with first and second output terminals coupled to respective ends of the LED load, the first rectifier comprising at least two diodes, one of which is shunted by a first capacitor,
  a second lamp end circuit comprising
  a third lamp pin and a fourth lamp pin for connection to
    a second lamp connection terminal comprised in the high frequency fluorescent lamp ballast,
    a second rectifier equipped with at least one input terminal coupled to the third lamp pin and with first and second output terminals coupled to respective ends of the LED load, the second rectifier comprising at least two diodes, one of which is shunted by a second capacitor,
  wherein the first capacitor and the second capacitor form a series arrangement coupled between the second lamp pin and the fourth lamp pin.

It is first of all noted that the LED replacement lamp according to the invention is preferably used in combination with a high frequency fluorescent ballast, but can also be used in combination with an electromagnetic fluorescent ballast. When operated with an electromagnetic ballast, the lamp will generate more light but will also consume more power than when operated with a high frequency fluorescent lamp ballast. In the further text it will be assumed that the LED replacement lamp is used in combination with a high frequency fluorescent ballast.

During operation of the LED replacement lamp according to the invention, the first and second rectifiers rectify the high frequency AC voltage supplied by the high frequency fluorescent lamp ballast into a DC voltage supplying the LED load. The series arrangement of the first and second capacitor form a string that during operation conducts an AC current. As a consequence only part of the current generated by the fluorescent lamp ballast is carried by the LED load, so that the power consumed by the LED replacement lamp is lower than the power supplied by the high frequency fluorescent ballast and also lower than the nominal power of the fluorescent lamp that the high frequency fluorescent lamp ballast was designed for. As a consequence energy is saved.

According to a further aspect of the invention a method is provided for supplying a LED load from a high frequency fluorescent ballast, comprising the following steps
  providing a LED load comprising a series arrangement of LEDs, providing a first pair of lamp pins and a second pair of lamp pins and connecting each pair to a lamp connection terminal of the high frequency fluorescent ballast,
rectifying the voltage present between the pairs of lamp pins,
supplying the LED load from the rectified voltage, and
providing a capacitive connection between a lamp pin of the first pair of lamp pins and a lamp pin of the second pair of lamp pins.

In a first preferred embodiment of a LED replacement lamp according to the invention, the LED load voltage is lower than the burning voltage of the fluorescent lamp that the high frequency fluorescent lamp ballast is designed for.

Since many lamp ballasts more or less act as a constant current source, the power in the LED replacement lamp can be made lower than that of the fluorescent lamp, that the fluorescent lamp ballast was designed for by choosing the LED load voltage lower than the burning voltage of the fluorescent lamp. This way of decreasing the power in the LED replacement lamp with respect to the power consumed by the fluorescent lamp, can be used in combination with the use of the capacitors comprised in the LED replacement lamp that carry part of the current generated by the high frequency ballast, so that it does not flow through the LED load. These two mechanisms for decreasing the power consumed by the LED replacement lamp provide two degrees of freedom for fine tuning the circuitry in the LED replacement lamp.

In another preferred embodiment of a LED replacement lamp according to the invention, a first filter capacitor is coupled between the output terminals of the first rectifier and a second filter capacitor is coupled between the output terminals of the second rectifier. Both these capacitors serve to decrease the high frequency ripple present in the rectified voltage that is present across the LED load.

In yet another preferred embodiment of a LED replacement lamp according to the invention, the two lamp pins of the first lamp end circuit are connected by a first filament emulation circuit and the two lamp pins of the second lamp end circuit are connected by a second filament emulation circuit. The filament emulation circuit can simply be a resistor having similar resistance as the filament resistance of a regular fluorescent lamp. The presence of such a filament emulation circuit is necessary for some fluorescent lamp ballasts that are equipped with filament detection circuitry. Preferably, the first filament emulation circuit and the second filament emulation circuit each comprise a fusistor. In this latter case the LED replacement lamp is also effectively protected against erroneous connection of the first or second pair of lamp pins to the mains voltage directly. More preferably, the first filament emulation circuit is a series arrangement comprising two fusistors and the first rectifier contains two diodes and a common terminal of the two diodes is connected to a terminal between the two fusistors, and the second filament emulation circuit is a series arrangement comprising two fusistors and the second rectifier contains two diodes and a common terminal of the two diodes is connected to a terminal between the two fusistors. In this latter configuration, the fusistors also protect against a too high current in the LED replacement lamp.

In a further preferred embodiment of a LED replacement lamp according to the invention, the first rectifier is a full bridge rectifier comprising four diodes and having a first input terminal and a second input terminal coupled to respective lamp pins of the first lamp end circuit, and the first capacitor is coupled between the first input terminal and first output terminal of the first rectifier and the first lamp end circuit comprises a third capacitor coupled between the second input terminal and the second output terminal of the first rectifier, and the second rectifier is a full bridge rectifier comprising four diodes and having a first input terminal and a second input terminal coupled to respective lamp pins of the second lamp end circuit, and the second capacitor is coupled between the first input terminal and the first output terminal of the second rectifier and wherein the second lamp end circuit comprises a fourth capacitor coupled between the second input terminal and the second output terminal of the second rectifier, wherein the third capacitor and the fourth capacitor form a series arrangement connecting the second lamp pin to the third lamp pin.

In case the further preferred embodiment of a LED replacement lamp according to the invention comprises electrode emulation circuits the power dissipation in these circuits is smaller than in embodiments of a LED replacement lamp according to the invention, wherein the rectifiers comprise only two diodes.

In yet another preferred embodiment of a LED replacement lamp according to the invention the LED replacement lamp is equipped with a transparent cylindrical lamp vessel surrounding the LED load and the first and second lamp end circuit and comprises a first lamp cap equipped with the two lamp pins comprised in the first lamp end circuit and a second lamp cap equipped with the two lamp pins comprised in the second lamp end circuit. The lamp vessel and lamp caps serve to keep the LED load and the first and second lamp end circuits free from dust and dirt and therefore improve lamp life.

BRIEF DESCRIPTION OF THE DRAWINGS

In the drawings, FIGS. 1, 2 and 3 show schematic representations of a first embodiment, a second embodiment and a third embodiment of a LED replacement lamp according to the invention.

DESCRIPTION OF EMBODIMENTS

Figure 3:
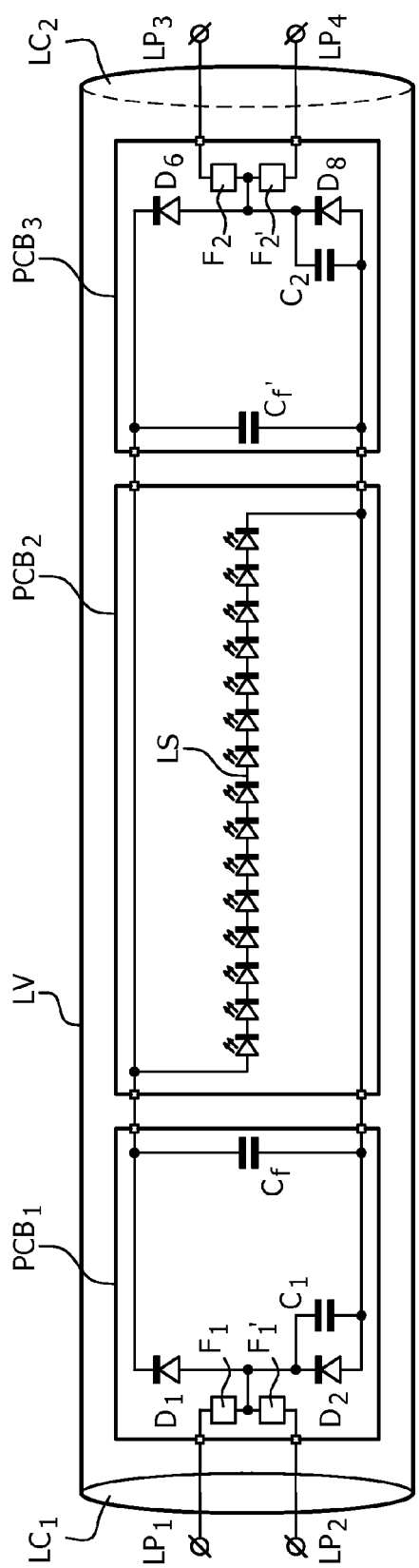

In FIG. 1, LV is a transparent cylindrical glass or plastic lamp vessel connected to a lamp cap LC1 at a first end and a lamp cap LC2 at a second end. Lamp cap LC1 is equipped with two lamp pins LP1 and LP2 and lamp cap LC2 is equipped with lamp pins LP3 and LP4. Lamp pins LP1 and LP2 are respectively connected to a first input terminal and a second input terminal of a full bridge rectifier formed by diodes D1-D4. In this embodiment this full bridge rectifier forms a first rectifier. Lamp pins LP1 and LP2 are also connected by means of an electrode emulation circuit formed by a fusistor F1. Diode D4 and diode D2 of the rectifier are shunted respectively by capacitor C1 and capacitor C3. Capacitor C1 thus connects the first input terminal and a first output terminal of the first rectifier and capacitor C3 connects the second input terminal to a second output terminal of the first rectifier. The first output terminal of the first rectifier is connected to the second output terminal of the first rectifier by means of a filter capacitor Cf. Lamp pins LP1 and LP2, fusistor F1, diodes D1-D4, capacitors C1, C3 and Cf together form a first lamp end circuit. The first lamp end circuit is mounted on a printed circuit board PCB1.

Lamp pins LP3 and LP4 are connected to a first input terminal and a second input terminal of a full bridge rectifier formed by diodes D5-D8. In this embodiment this full bridge rectifier forms a second rectifier. Lamp pins LP3 and LP4 are also connected by means of a electrode emulation circuit formed by a fusistor F2. Diode D8 and diode D5 of the second rectifier are shunted respectively by capacitor C2 and capacitor C4. Capacitor C2 thus connects the first input terminal and a first output terminal of the second rectifier and capacitor C3 connects the second input terminal to a second output terminal of the second rectifier. The first output terminal of the second rectifier is connected to the second output terminal of the second rectifier by means of a filter capacitor Cf". Lamp pins LP3 and LP4, fusistor F2, diodes D5-D8, capacitors C2, C4 and Cf" together form a second lamp end circuit. The second lamp end circuit is mounted on printed circuit board PCB3.

The output terminals of the first rectifier and the output terminals of the second rectifier are connected by means of conductors. LS is a LED load formed by a LED string that is connected between the output terminals of the first rectifier and also to the output terminals of the second rectifier. The LED load LS is mounted on a printed circuit board PCB2.

The operation of the LED replacement lamp shown in FIG. 1 is as follows. When the lamp pins LP1-LP4 are connected to the lamp connection terminals of a high frequency fluorescent lamp ballast that is equipped with lamp presence detection, the lamp presence detection circuitry will try to detect the presence of a lamp electrode. In case a regular fluorescent lamp is connected to the high frequency fluorescent lamp ballast, the lamp filaments will carry a start-up current. If no lamp is connected, no start-up current will flow and the high frequency fluorescent lamp ballast will not supply a high frequency voltage to the lamp connection terminals. In case of the LED replacement lamp shown in FIG. 1, the start-up current will be carried by the fusistors so that the high frequency fluorescent lamp ballast will supply a high frequency voltage to the lamp connection terminals and thus also to the lamp pins. This voltage is rectified by the first and the second rectifier and the rectified voltage is present between the output terminals of each of the rectifiers, across the filter capacitors Cf and Cf" and across the LED load. The rectified voltage causes a DC current to flow through the LED load LS. At the same time the series arrangement of capacitor C1 and capacitor C2 carries an AC current that flows between lamp pins LP2 and LP4 and the series arrangement of capacitors C3 and C4 carries an AC current that flows between lamp pins LP1 and LP3. As a consequence not all the current generated by the high frequency fluorescent lamp ballast is carried by the LED load but a part of that current is carried by capacitors C1-C4. Additionally the LED load voltage is generally chosen lower than that of the fluorescent lamp that the high frequency fluorescent lamp ballast was designed for.

The LED load thus consumes a lower power than the nominal power of the fluorescent lamp that the high frequency fluorescent lamp ballast was designed for. Since the LEDs produce more light for a given consumed power than a fluorescent lamp and a LED replacement lamp has a much higher optical efficiency, it is possible to design the LED replacement lamp so that it produces the same light intensity on a surface of a desk situated under the lamp but consumes far less energy than a fluorescent lamp. The LED replacement lamp thus offers the possibility of saving energy.

A second embodiment of a LED replacement lamp is shown in FIG. 2. In FIG. 2 components and circuit parts corresponding to components and circuit parts comprised in the embodiment shown in FIG. 1 are labeled with the same reference signs.

A difference between the embodiment shown in FIG. 1 and the embodiment shown in FIG. 2 are that the first and second rectifiers comprised in the latter only comprise two diodes (D1, D2 and D8, D6 respectively). Furthermore only diode D2 and diode D8 are shunted by capacitor C1 and C2 respectively. Apart from filter capacitors Cf and Cf" no other capacitors are comprised in the LED replacement lamp. The embodiment in FIG. 2 is cheaper than the one in FIG. 1 since it comprises less components.

The operation of the LED replacement lamp in FIG. 2 is very similar to the operation of the one shown in FIG. 1. A difference is that the power dissipation in the fusistors F1 and F2 may be bigger than that in the embodiment shown in FIG. 1, because for some lamp configurations the fusistors need to carry the ballast output current.

Furthermore there is only one series arrangement of capacitor C1 and capacitor C2 carrying an AC current between the lamp pins.

A third embodiment of a LED replacement lamp according to the invention is shown in FIG. 3. Again the same reference signs are used for corresponding components and circuit parts.

The embodiment shown in FIG. 3 differs from the one shown in FIG. 2, in that the fusistor F1 has been replaced by a series arrangement of two fusistors F1 and F1' and fusistor F2 has been replaced by a series arrangement of two fusistors F2 and F2'. A common terminal of fusistors F1 and F1' is connected to a common terminal of diodes D1 and D2 and a common terminal of fusistors F2 and F2' is connected to a common terminal of diodes D8 and D6.

The operation of the embodiment shown in FIG. 3 is very similar to that of the embodiments in FIG. 1 and FIG. 2. An important difference is that the fusistors comprised in the embodiments shown in FIG. 1 and FIG. 2 only prevent damage in case the mains voltage is directly connected between lamp pins LP1 and LP2 or between lamp pins LP3 and LP4. In the embodiment shown in FIG. 3 protection also exists against a too high current in the LED replacement lamp.

Figure 4:
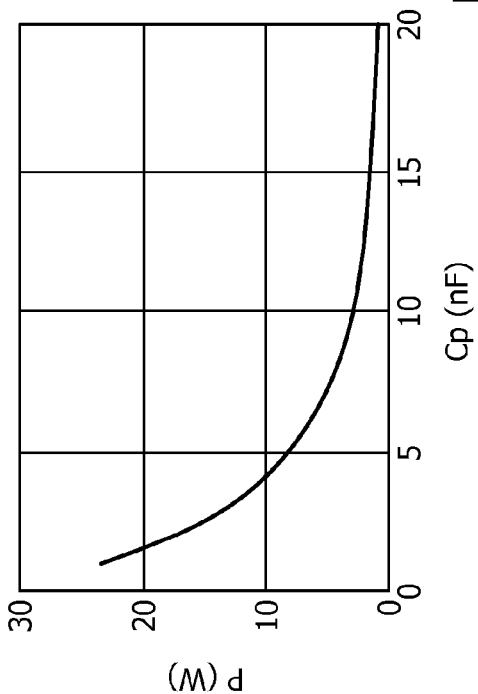
FIG. 4 shows the lamp power as a function of the total capacitance of the series arrangements comprising shunt capacitors and shunting the lamp.

FIG. 4 shows the power consumed by a LED replacement lamp in Watt as a function of the total effective capacity shunting the lamp in nanoFarad. This total effective capacity for the embodiment in FIG. 1 is the capacity of the parallel arrangement of on the one hand capacitors C1 and C2 in series and on the other hand capacitors C3 and C4 in series. In the embodiments shown in FIG. 2 and FIG. 3 this total capacity is the capacity of the series arrangement of capacitors C1 and C2. This curve was found for a resonant inductor Lr=2 mH, a resonant capacitor Cr=8.2 nF, an operating frequency of 45 kHz and a lamp load simulated with a resistor with a resistance of 1 kohm.

It can be seen that the power consumed by the LED replacement lamp can be adjusted over a wide range by adjusting the total capacity.

In conclusion, a LED replacement lamp according to the invention offers many important advantages: The LED replacement lamp only comprises a small number of components, is cheap, is symmetrical, is comparatively easy to manufacture and is very suitable for substantial energy saving. Furthermore, the capacity shunting the lamp is implemented by means of capacitors shunting the rectifier diodes. These capacitors are thus comprised in the lamp end circuits, so that no additional connection between the printed circuit boards is necessary for the shunting capacity. As a consequence the LED replacement lamp according to the invention has the important advantage that there are only three tracks between the lamp ends: the two connections between the output terminals of the first rectifier and the output terminals of the second rectifier, and the LED load. Since connections between PCB's are vulnerable, it is desirable to minimize their number. The LED replacement lamp according to the invention is suitable for drop-in replacement of fluorescent lamps, meaning that rewiring or opening of the fixture are not necessary: it is only necessary to connect the LED replacement lamp to the lamp connection terminals of the fluorescent lamp ballast.

While the invention has been illustrated and described in detail in the drawings and foregoing description, such illustration and description are to be considered illustrative or exemplary and not restrictive; the invention is not limited to the disclosed embodiments.

Variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage.

The invention claimed is:

1. A light emitting diode (LED) lamp, comprising:
   an LED load comprising a series arrangement of LEDs,
   a first lamp end circuit, comprising:
      a first lamp pin and a second lamp pin for connection to a first lamp connection terminal comprised in a fluorescent lamp ballast, and
      a first rectifier equipped with at least one input terminal coupled to the second lamp pin and with first and second output terminals coupled to respective ends of the LED load, the first rectifier comprising at least two diodes, one of which is shunted by a first capacitor, and
   a second lamp end circuit, comprising:
      a third lamp pin and a fourth lamp pin for connection to a second lamp connection terminal comprised in the fluorescent lamp ballast, and
      a second rectifier equipped with at least one input terminal coupled to the fourth lamp pin and with first and second output terminals coupled to respective ends of the LED load, the second rectifier comprising at least two diodes, one of which is shunted by a second capacitor,
   wherein the first capacitor and the second capacitor are connected in series with each other between the second lamp pin and the fourth lamp pin, and
   wherein the two lamp pins of the first lamp end circuit are connected by a first filament emulation circuit and wherein the two lamp pins of the second lamp end circuit are connected by a second filament emulation circuit.

2. The LED lamp of claim 1, wherein a first filter capacitor is coupled between the output terminals of the first rectifier and a second filter capacitor is coupled between the output terminals of the second rectifier.

3. The LED lamp of in claim 1,
   wherein the first rectifier is a full bridge rectifier comprising four diodes and having a first input terminal and a second input terminal coupled to respective lamp pins of the first lamp end circuit,
   wherein the first capacitor is coupled between the first input terminal and the first output terminal of the first rectifier and wherein the first lamp end circuit comprises a third capacitor coupled between the second input terminal and the second output terminal of the first rectifier,
   wherein the second rectifier is a full bridge rectifier comprising four diodes and having a first input terminal and a second input terminal coupled to respective lamp pins of the second lamp end circuit,
   wherein the second capacitor is coupled between the first input terminal and the first output terminal of the second rectifier,
   wherein the second lamp end circuit comprises a fourth capacitor coupled between the second input terminal and the second output terminal of the second rectifier,
   wherein the third capacitor and the fourth capacitor form a series arrangement connecting the first lamp pin to the third lamp pin.

4. The LED lamp of claim 1, wherein the first filament emulation circuit and the second filament emulation circuit each comprise a fusistor.

5. The LED lamp of claim 1,
   wherein the first filament emulation circuit is a series arrangement comprising two fusistors and the first rectifier contains two diodes and a common terminal of the two diodes is connected to a terminal between the two fusistors,
   wherein the second filament emulation circuit is a series arrangement comprising two fusistors and the second rectifier contains two diodes and a common terminal of the two diodes is connected to a terminal between the two fusistors.

6. The LED lamp of claim 1, comprising a transparent cylindrical lamp vessel surrounding the LED load and the first and second lamp load circuit, the transparent cylindrical lamp vessel comprising a first lamp cap equipped with the two lamp pins comprised in the first lamp end circuit and a second lamp cap equipped with the two lamp pins comprised in the second lamp end circuit.

7. The LED lamp of claim 1, wherein the LED load voltage is lower than a burning voltage of a fluorescent lamp when the fluorescent lamp ballast is connected to the fluorescent .

8. A method for supplying electrical power to a light emitting diode (LED) load from a high frequency fluorescent ballast, the method comprising:
   providing the LED load comprising a series arrangement of LEDs,
   providing a first pair of lamp pins comprising first and second lamp pins and a second pair of lamp pins comprising third and fourth lamp pins,
   connecting each pair to a lamp connection terminal of the high frequency fluorescent ballast,
   rectifying a first voltage present between the first pair of lamp pins via a first rectifier comprising at least two first rectifier diodes,
   rectifying a second voltage present between the second pair of lamp pins via a second rectifier the first rectifier comprising at least two second rectifier diodes,
   supplying the LED load from the rectified first and second voltages, and
   providing a capacitive connection between the second lamp pin and the fourth lamp pin, wherein the capacitive connection includes a first capacitor connected directly across and in parallel with a first one of the first rectifier diodes, and a second capacitor connected directly across and in parallel with a first one of the second rectifier diodes, the method further comprising:
providing a first filament emulation circuit connecting the first and second pins of the first lamp end circuit to each other, and
providing a second filament emulation circuit connecting the third and fourth pins of the second lamp end circuit to each other.

9. The method of claim 8, wherein the first filament emulation circuit and the second filament emulation circuit each comprise a fusistor.

10. The method of claim 8,
wherein the first filament emulation circuit is a series arrangement comprising two first fusistors, and a common terminal of the two first rectifier diodes is connected to a terminal between the two first fusistors, and
wherein the second filament emulation circuit is a series arrangement comprising two second fusistors, and a common terminal of the two second rectifier diodes is connected to a terminal between the two second fusistors.

11. The method of claim 8, further comprising providing a second capacitive connection between the second lamp pin and the fourth lamp pin, wherein the second capacitive connection includes a third capacitor connected directly across a second one of the first rectifier diodes, and a fourth capacitor connected directly across and in parallel with a second one of the second rectifier diodes.

12. The method of claim 8, wherein:
the first rectifier has a first input terminal and a second input terminal coupled to respective lamp pins of the first lamp end circuit,
wherein the first capacitor is coupled between the first input terminal and the first output terminal of the first rectifier,
wherein the second rectifier has a first input terminal and a second input terminal coupled to respective lamp pins of the second lamp end circuit, and
wherein the second capacitor is coupled between the first input terminal and the first output terminal of the second rectifier.

13. The method of claim 8, wherein the first capacitor and the second capacitor are connected in series with each other between the second lamp pin and the fourth lamp pin.

* * * * *